(12) United States Patent
Seo et al.

(10) Patent No.: US 12,124,760 B2
(45) Date of Patent: Oct. 22, 2024

(54) ELECTRONIC DEVICE INCLUDING STANDBY MODE, DISPLAY DEVICE, DISPLAY SYSTEM, AND CONTROL METHOD THEREOF

(71) Applicant: SAMSUNG ELECTRONICS CO., LTD., Suwon-si (KR)

(72) Inventors: Gaewon Seo, Suwon-si (KR); Yeongchan Bae, Suwon-si (KR); Inhwa Seo, Suwon-si (KR); Daeun Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/243,873

(22) Filed: Sep. 8, 2023

(65) Prior Publication Data

US 2024/0061635 A1    Feb. 22, 2024

Related U.S. Application Data

(63) Continuation of application No. PCT/KR2023/011574, filed on Aug. 7, 2023.

(30) Foreign Application Priority Data

Aug. 22, 2022  (KR) .................. 10-2022-0105086
Oct. 5, 2022   (KR) .................. 10-2022-0127372

(51) Int. Cl.
   *G09G 5/00*    (2006.01)
   *G06F 3/14*    (2006.01)
   (Continued)

(52) U.S. Cl.
   CPC ....... *G06F 3/1446* (2013.01); *H04N 21/4122* (2013.01); *H04N 21/42221* (2013.01); *H04N 21/43076* (2020.08); *H04N 21/4432* (2013.01)

(58) Field of Classification Search
   CPC .. G06F 3/1446; G09G 5/14; G09G 2300/026; G09G 2330/02; H04N 21/4122;
   (Continued)

(56) References Cited

U.S. PATENT DOCUMENTS 8,965,215 B2    2/2015  Na et al.
10,809,961 B2 * 10/2020  Kim .................... G09G 3/2096
   (Continued)

FOREIGN PATENT DOCUMENTS

JP        6024590 B2     11/2016
KR    10-0519299 B1     10/2005
   (Continued)

OTHER PUBLICATIONS

International Search Report dated Nov. 29, 2023, issued by the International Searching Authority in International Application No. PCT/KR2023/011574 (PCT/ISA/210).
   (Continued)

*Primary Examiner* — Joe H Cheng
(74) *Attorney, Agent, or Firm* — Sughrue Mion, PLLC

(57) ABSTRACT

The present disclosure provides methods, apparatuses, systems, and computer-readable mediums for switching from a standby mode to a normal mode. In some embodiments, an electronic device includes a communication interface including a plurality of communication modules configured to communicate with a corresponding plurality of display modules of a display device, a memory storing instructions, and at least one processor configured to execute the instructions to transmit, to a first communication module, a first pulse signal configured to turn on the first communication module in a first time period, transmit, to a first display module, a first control signal based on having received a first remote control signal configured to switch the electronic device from the standby mode to a normal mode, and switch
   (Continued)

the electronic device from the standby mode to the normal mode based on receiving a first response signal indicating reception of the first control signal.

20 Claims, 8 Drawing Sheets

(51) Int. Cl.
*H04N 21/41* (2011.01)
*H04N 21/422* (2011.01)
*H04N 21/43* (2011.01)
*H04N 21/443* (2011.01)

(58) Field of Classification Search
CPC ....... H04N 21/42221; H04N 21/43076; H04N 21/4432; H04N 21/4436
See application file for complete search history.

(56) References Cited

U.S. PATENT DOCUMENTS

| | | | |
|---|---|---|---|
| 11,049,443 B2* | 6/2021 | Kim | G09G 3/20 |
| 11,327,855 B2* | 5/2022 | Kim | G06F 3/1423 |
| 11,735,095 B2* | 8/2023 | Seo | G09G 5/005 |
| | | | 345/428 |
| 2005/0134525 A1* | 6/2005 | Tanghe | G06F 3/1446 |
| | | | 345/1.1 |
| 2008/0276109 A1* | 11/2008 | Yoshida | G09G 3/3406 |
| | | | 713/340 |
| 2012/0042352 A1 | 2/2012 | Wang et al. | |
| 2012/0044273 A1* | 2/2012 | Park | G09G 3/3208 |
| | | | 345/211 |
| 2017/0110005 A1* | 4/2017 | Yang | G08C 23/04 |
| 2017/0180918 A1* | 6/2017 | Yang | H04N 5/63 |
| 2020/0150835 A1* | 5/2020 | Park | G06F 3/167 |
| 2021/0048969 A1* | 2/2021 | Kim | G09G 5/12 |
| 2021/0398532 A1 | 12/2021 | Yoon | |

FOREIGN PATENT DOCUMENTS

| | | |
|---|---|---|
| KR | 10-2006-0119548 A | 11/2006 |
| KR | 10-0675831 B1 | 1/2007 |
| KR | 10-2010-0045737 A | 5/2010 |
| KR | 10-1091568 B1 | 12/2011 |
| KR | 10-1170937 B1 | 8/2012 |
| KR | 10-1239195 B1 | 3/2013 |
| KR | 10-2014-0046562 A | 4/2014 |
| KR | 10-2016-0056577 A | 5/2016 |
| KR | 10-2220108 B1 | 2/2021 |
| KR | 10-2021-0157586 A | 12/2021 |
| KR | 10-2022-0072974 A | 6/2022 |
| KR | 10-2022-0102942 A | 7/2022 |
| WO | WO-2023243901 A1 * | 12/2023 |

OTHER PUBLICATIONS

Written Opinion dated Nov. 29, 2023, issued by the International Searching Authority in International Application No. PCT/KR2023/011574 (PCT/ISA/237).

* cited by examiner

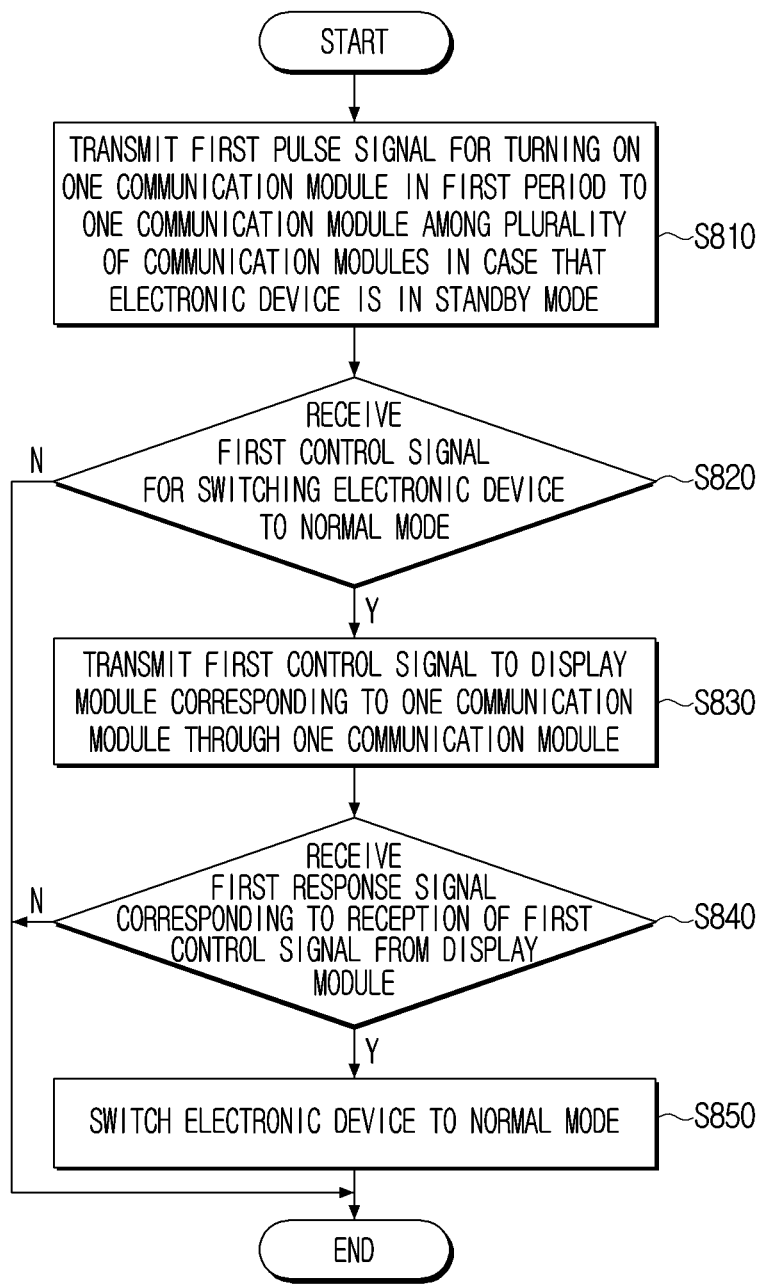

ELECTRONIC DEVICE INCLUDING STANDBY MODE, DISPLAY DEVICE, DISPLAY SYSTEM, AND CONTROL METHOD THEREOF

CROSS-REFERENCE TO RELATED APPLICATIONS

This application is a continuation application of International Application No. PCT/KR2023/011574, filed on Aug. 7, 2023, which claims priority to Korean Patent Application No. 10-2022-0105086, filed on Aug. 22, 2022, in the Korean Intellectual Property Office, and to Korean Patent Application No. 10-2022-0127372, filed on Oct. 5, 2022, in the Korean Intellectual Property Office, the disclosures of which are incorporated by reference herein in their entireties.

BACKGROUND

Field

The disclosure relates generally to an electronic device, a display device, a display system, and a control method thereof, and more particularly, to an electronic device switched from a standby mode to a normal mode, a display device communicating with the electronic device, a display system including the electronic device and the display device, and a control method thereof.

Description of the Related Art

In recent years, various types of display systems have been developed and supplied, such as, but not limited to, modular display devices.

In addition, the number of display modules and/or display devices included in the display systems may have increased as the display systems increase in size and/or resolution.

For example, the size and/or shape of a modular display device may be variously changed based on the number of display devices included in the modular display device, the size of the modular display device, or the like.

Furthermore, the modular display device may include a control box configured to control the modular display device. The modular display device and the control box may be connected to each other in a wired and/or wireless manner. Alternatively or additionally, the modular display device and the control box may be spaced apart from each other (e.g., different locations) and/or may be co-located with each other.

In some scenarios, a control signal for switching one device to a normal (e.g., turned on) mode may not be able to be transmitted to another device when the modular display device and the control box are in a standby mode (or turned off). However, it may be inconvenient to be required to transmit the control signal to each of the modular display device and the control box in order to switch both devices to the normal mode.

Thus, there is a demand for a method of automatically switching the other device to the normal mode if one device is switched to the normal mode in a case in which each of the modular display device and the control box are in the standby mode (or turned off).

SUMMARY

According to an aspect of the disclosure, an electronic device includes a communication interface, a memory storing instructions, and at least one processor communicatively coupled to the communication interface and the memory. The communication interface includes a plurality of communication modules configured to communicate with a plurality of display modules of a display device. Each communication module of the plurality of communication modules corresponds to a display module of the plurality of display modules. The at least one processor is configured to execute the instructions to transmit, to a first communication module of the plurality of communication modules, a first pulse signal configured to turn on the first communication module in a first time period, based on a standby mode of the electronic device. The at least one processor is further configured to execute the instructions to transmit, via the first communication module to a first display module of the plurality of display modules corresponding to the first communication module, a first control signal based on having received a first remote control signal configured to switch the electronic device from the standby mode to a normal mode. The at least one processor is further configured to execute the instructions to switch the electronic device from the standby mode to the normal mode based on receiving, from the first display module, a first response signal indicating reception of the first control signal by the first display module.

According to an aspect of the present disclosure, a control method of an electronic device is provided. The control method includes transmitting, to a first communication module of a plurality of communication modules of the electronic device, a first pulse signal configured to turn on the first communication module in a first time period, based on the electronic device being in a standby mode. The control method further includes transmitting, via the first communication module to a first display module of a plurality of display modules of a display device corresponding to the first communication module, a first control signal, based on receiving a first remote control signal configured to switch the electronic device from the standby mode to a normal mode. The control method further includes switching the electronic device to the normal mode based on receiving, from the first display module, a first response signal indicating reception of the first control signal by the first display module.

According to an aspect of the present disclosure, a display system is provided. The display system includes an electronic device and a display device. The electronic device includes a first communication interface including a plurality of first communication modules, and at least one first processor configured to transmit, to a first communication module of the plurality of first communication modules, a first pulse signal configured to turn on the first communication module in a first period, when the electronic device is in a standby mode. The display device includes a plurality of display modules, a plurality of second communication modules corresponding to the plurality of first communication modules, and at least one second processor configured to transmit, to a second communication module of the plurality of second communication modules, a second pulse signal configured to turn on the first communication module in a second period, when the display device is in the standby mode. Each of the plurality of display modules includes a second communication interface.

According to an aspect of the present disclosure, a non-transitory computer-readable recording medium which includes a program for executing a control method of an electronic device is provided. The control method includes transmitting, to a first communication module of a plurality of communication modules of the electronic device, a first pulse signal configured to turn on the first communication module in a first time period, based on the electronic device being in a standby mode. The control method further includes transmitting, via the first communication module to a first display module of a plurality of display modules of a display device corresponding to the first communication module, a first control signal, based on receiving a first remote control signal configured to switch the electronic device from the standby mode to a normal mode. The control method further includes switching the electronic device to the normal mode based on receiving, from the first display module, a first response signal indicating reception of the first control signal by the first display module.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 8 is a flowchart of a control method of an electronic device, according to one or more embodiments of the disclosure.

DETAILED DESCRIPTION

Figure 1:
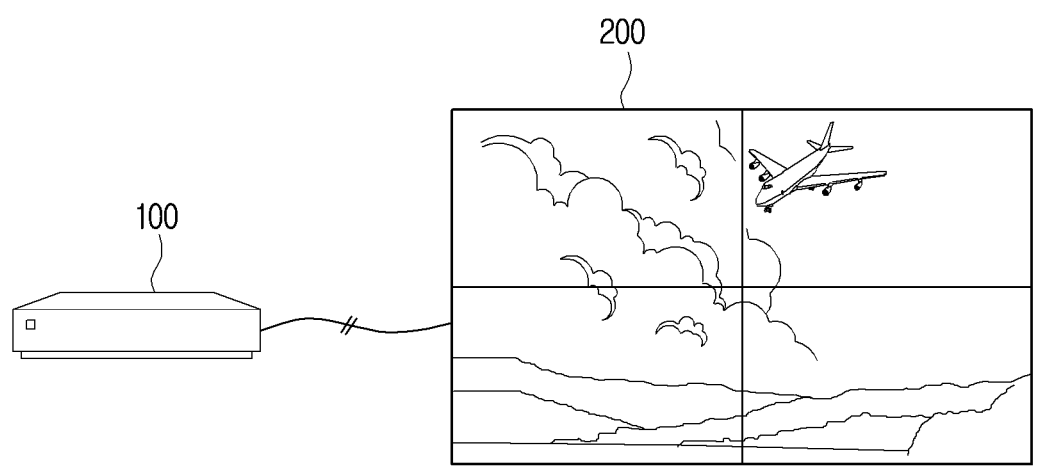
FIG. 1 is a view of an electronic device and a display device, according to one or more embodiments of the disclosure.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

General terms that are currently widely used may be selected as terms used in embodiments of the disclosure in consideration of their functions in the disclosure, and may be changed based on the intention of those skilled in the art or a judicial precedent, the emergence of a new technique, and the like. Alternatively or additionally, in a specific case, terms arbitrarily chosen by an applicant may exist. In this case, the meanings of such terms may be mentioned in detail in corresponding descriptions of the disclosure. Therefore, the terms used in the embodiments of the disclosure may need to be defined on the basis of the meanings of the terms and the content throughout the disclosure rather than simple names of the terms.

In the disclosure, expressions such as "have," "may have," "include," "may include", and the like, may indicate the existence of a corresponding feature (e.g., a numerical value, a function, an operation, and/or a component such as a part), and may not exclude the existence of an additional feature.

The expression "at least one of A or B" may indicates "A," "B," or both of "A" and "B."

Expressions such as "first," "second," and the like, as used in the disclosure may indicate various components regardless of a sequence or importance of the components. These expressions may be used only in order to distinguish one component from the other components, and may not limit the corresponding components in another aspect (e.g., importance or order).

If a component (e.g., a first component) is mentioned to be "(operatively or communicatively) coupled with/to" or "connected to" another component (e.g., a second component), it is to be understood that the component may be coupled with the other component directly (e.g., wired, wirelessly) and/or may be coupled through still another component (e.g., a third component).

A term of a singular number may include its plural number unless explicitly indicated otherwise in the context. It is to be understood that terms such as "include," "formed of," and the like as used in the disclosure may specify the presence of features, numerals, steps, operations, components, parts, or combinations thereof, mentioned in the specification, and may not preclude the presence and/or addition of one or more other features, numerals, steps, operations, components, parts, or combinations thereof.

In the embodiments, a "module" and/or a "~er/~or" may perform at least one function and/or operation, and be implemented by hardware, software, and/or a combination of hardware and software. In addition, a plurality of "modules" and/or a plurality of "~ers/~ors" may be integrated in at least one module and may be implemented by at least one processor except for a "module" and/or a "~er/or" that may need to be implemented by specific hardware.

In the disclosure, a term "user" may refer to a person who uses an electronic device and/or a device (e.g., artificial intelligence electronic device) which uses an electronic device.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, the embodiments of the disclosure are described in detail with reference to the accompanying drawings.

FIG. 1 is a view of an electronic device and a display device, according to one or more embodiments of the disclosure.

Referring to FIG. 1, an electronic device 100, according to one or more embodiments of the disclosure, may communicate with a display device 200.

For example, the electronic device 100 may be and/or include a control box (e.g., a signal box (S-BOX)). In an embodiment, the control box may transmit content, a control signal, and the like to the display device 200, and may receive state information of the display device 200, a control signal, and the like, from the display device 200.

In an embodiment, the electronic device 100 may be connected in a wired manner to an electrical outlet positioned on a wall, and may supply power to the display device 200.

However, this configuration is only an example, and present disclosure is not limited in this regard. For example, the electronic device 100 may include, but not be limited to, at least one of a television (TV), a user terminal device, a tablet personal computer (PC), a mobile phone, a video phone, an e-book reader, a desktop PC, a laptop PC, a net-book computer, a workstation, a server, a personal digital assistant (PDA), a portable multimedia player (PMP), an MPEG-1 Audio Layer 3 (MP3) player, a medical device, a camera, a virtual reality (VR)-enabled device, and a wearable device, in addition to the control box. As used herein, the wearable device may refer at least one of an accessory type (e.g., a watch, a ring, a bracelet, an anklet, a necklace, glasses, a contact lens, a head-mounted-device (HMD)), a textile or clothing integral type (e.g., an electronic clothing), a body attachment type (e.g., a skin pad, a tattoo), or a living body implantation type circuit. In some embodiments, the electronic device 100 may include, but not be limited to, at least one of a digital video disk (DVD) player, an audio player, a refrigerator, an air conditioner, a vacuum cleaner, an oven, a microwave oven, a washing machine, an air purifier, a source device (e.g., a set-top box (STB), a cloud server, an over-the-top media (OTT) service server), a home automation control panel, a security control panel, a media box (e.g., Samsung HomeSync™, Apple TV™, Google TV™), a game console (e.g., Microsoft Xbox™, Sony PlayStation™), an electronic dictionary, an electronic key, a camcorder, an electronic picture frame, and the like.

In other embodiments, the electronic device 100 may include, but not be limited to, at least one of various medical devices (e.g., various portable medical monitors (such as a blood glucose monitor, a heart rate monitor, a blood pressure monitor, and a body temperature monitor), a magnetic resonance angiography (MRA), a magnetic resonance imaging (MRI), a computed tomography (CT), a camera, a sonicator), a navigation device, a global positioning system (e.g., global navigation satellite system (GNSS)), an event data recorder (EDR), a flight data recorder (FDR), an automotive infotainment device, marine electronic equipment (e.g., a marine navigation system, a gyro compass), an avionics device, a security device, a vehicle head unit, an industrial and/or home robot, a drone, an automated teller machine (ATM), a point of sales (POS) device, or an Internet of Things (IoT) device (e.g., a light bulb, various sensors, a sprinkler device, a fire alarm, a thermostat, a street light, a toaster, fitness equipment, a hot water tank, a heater, a boiler). Hereinafter, for convenience of description, the disclosure is described assuming a case where the electronic device 100 is a control box. However, the disclosure is not limited in this regard.

As shown in FIG. 1, the display device 200 may communicate with the electronic device 100 to receive a control signal for controlling the display device 200 and/or receive content (e.g., video data) and the like from the electronic device 100.

The display device 200, according to one or more embodiments, may output (e.g., display) the content. For example, the display device 200 may output the content received from the electronic device 100. The display device 200 may be implemented as a TV, but is not limited in this regard. For example, the display device 200 may be implemented as any of various types of devices having a display function such as, but not limited to, a video wall, a large format display (LFD), a digital signage, a digital information display (DID), and a projector display.

Alternatively or additionally, the display device 200 may include various types of displays such as, but not limited to, a liquid crystal display (LCD), an organic light-emitting diode (OLED) display, a liquid crystal on silicon (LCoS) display, a digital light processing (DLP) display, a quantum dot (QD) display panel, and a quantum dot light-emitting diodes (QLED) display.

In an embodiment, the display device 200 may include a modular display device. The modular display device may include and combine a plurality of display modules to each other, thereby implementing one display device (e.g., the modular display device).

Each of the plurality of display modules, according to one or more embodiments, may include a communication module.

Alternatively or additionally, the electronic device 100 may include a plurality of communication modules. Each of the plurality of communication modules included in the electronic device 100 may correspond to a communication module of a display module in the plurality of display modules of the display device 200.

For example, a communication module of the plurality of communication modules included in the electronic device 100 may transmit content, a control signal, and the like by communicating with a corresponding communication module included in a display module of the plurality of display modules included in the display device 200.

Continuing to refer to FIG. 1, the electronic device 100 and the display device 200 may communicate with each other by being connected to each other in a wired manner (e.g., by an optical cable), and/or may communicate with each other by being connected to each other in a wireless manner. Hereinafter, for convenience of description, the disclosure is described assuming a case where the electronic device 100 and the display device 200 communicate with each other by being connected to each other in the wired manner. However, the disclosure is not limited in this regard.

For example, the electronic device 100 and the display device 200 may be spaced apart from each other by a length of the optical cable in a case where the electronic device 100 and the display device 200 are connected to each other by the optical cable.

Typically, related display devices may be unable to be automatically turned on from a turned-off (or standby) state when a related electronic device is turned on from a turned-off (or standby) state in response a user command. Alternatively or additionally, the related electronic device may be unable to be turned on from a turned-off (or standby) state when the related display device is turned on from a turned-off (or standby) state in response the user command. That is, related turned-on devices (e.g., display devices, control boxes) may be unable to transmit, to the other turned-off or standby related device (e.g., display devices, control boxes), a control signal to turn on the other related device through the optical cable. Consequently, related display devices and electronic devices may not be able to synchronize turn-on states.

Accordingly, a user may be inconvenienced to turn on both the related art electronic device and the related art display device 200 by directly inputting a user command (e.g., a control command to turn on the device) to each of the related electronic device and the related display device that may be spaced apart from each other and/or connected to each other by an optical cable.

Hereinafter, the disclosure describes various embodiments of synchronizing the turn-on states between the electronic device 100 and the display device 200 by automatically turning on the other device in case that one of the electronic device 100 and the display device 200 is turned on.

Figure 2:
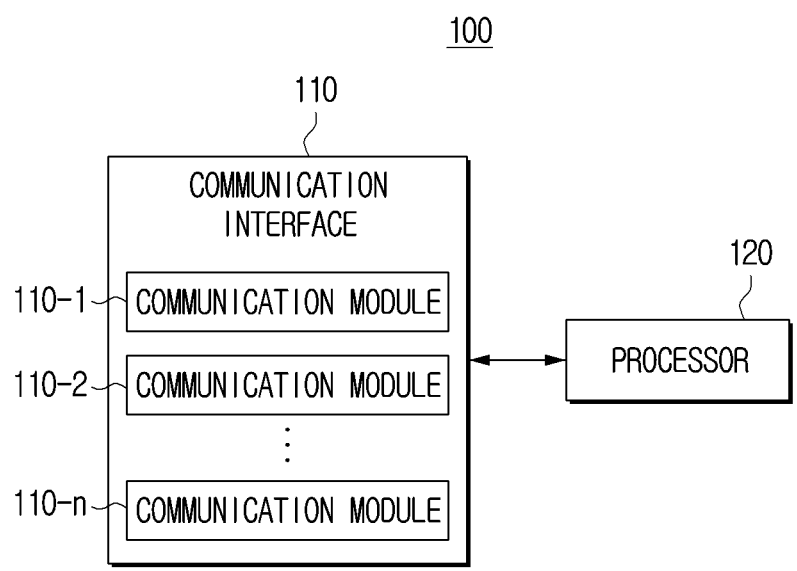
FIG. 2 is a block diagram of a configuration of the electronic device, according to one or more embodiments of the disclosure.

FIG. 2 is a block diagram of a configuration of the electronic device, according to one or more embodiments of the disclosure.

Referring to FIG. 2, the electronic device 100 may include a communication interface 110 and at least one processor 120.

In an embodiment, the communication interface 110 may communicate with an external device (e.g., the display device 200), an external server (e.g., a web server, a streaming server) and the like, by using a communication method such as an access point (AP)-based wireless communication (e.g., a wireless local area network (LAN) such as, but not limited to, Institute of Electrical and Electronics Engineers (IEEE) 802.11x, wireless fidelity (Wi-Fi))), a Bluetooth™ communication, a Zigbee communication, a wired and/or wireless LAN, a wide area network (WAN), Ethernet, an IEEE 1394 (FireWire), a high definition multimedia interface (HDMI), a universal serial bus (USB), a mobile high-definition link (MHL), an Audio Engineering Society/European Broadcasting Union (AES/EBU) communication, an optical communication, a coaxial communication, and the like.

For example, the communication interface 110, according to one or more embodiments of the disclosure, may include a plurality of communication modules (e.g., 110-1 to 110-n, hereinafter "110" generally).

In an embodiment, each of the plurality of communication modules 110 may be and/or may include an electronic module which may transmit data to the external device (e.g., display device 200) through an optical fiber cable. For example, the electronic module may include a small form-factor pluggable (SFP) transceiver module which may convert an electrical signal to an optical signal or converting the optical signal to the electrical signal.

Each of the plurality of communication modules 110 may transmit and/or receive data to and/or from a corresponding communication module among the plurality of communication modules included in the display device 200 through the optical fiber cable.

At least one processor 120, according to one or more embodiments of the disclosure, may control overall operations of the electronic device 100.

According to one or more embodiments of the disclosure, the processor 120 may be implemented as a digital signal processor (DSP) processing a digital signal, a microprocessor, and/or a time controller (TCON). However, the processor 120 is not limited thereto, and may include, and not be limited to, at least one of a central processing unit (CPU), a micro controller unit (MCU), a micro processing unit (MPU), a graphics processing unit (GPU), an accelerated processing unit (APU), a many integrated core (MIC), a neural processing unit (NPU), a controller, an application processor (AP), a communication processor (CP), an advanced reduced instruction set computer (RISC) machines (ARM) processor, an artificial intelligence (AI) processor, or may be defined by this term. Alternatively or additionally, the processor 120 may be implemented in a system-on-chip (SoC) and/or a large scale integration (LSI) in which a processing algorithm may be embedded. For another example, the processor 120 may be implemented in the form of a field programmable gate array (FPGA). The processor 120 may perform various functions by executing computer executable instructions stored in a memory (not shown).

In an embodiment, the processor 120 may include at least one of a hardware accelerator and a machine learning accelerator. The processor 120 may control one of other components of the electronic device or any combination thereof, and/or perform operations related to the communication and/or data processing. The processor 120 may execute at least one program or instruction stored in the memory. For example, the processor 120 may perform a method according to one or more embodiments of the disclosure by executing at least one instruction stored in the memory.

A plurality of operations may be performed by one processor 120 or may be performed by a plurality of processors 120 in a case that the method, according to one or more embodiments of the disclosure, includes the plurality of operations. For example, a first operation, a second operation, and a third operation may be performed by the method according to one or more embodiments. In this case, the first operation, the second operation, and the third operation may all be performed by a first processor. Alternatively or additionally, the first operation and the second operation may be performed by the first processor (e.g., a general-purpose processor), and the third operation may be performed by a second processor (e.g., an artificial intelligence-only processor).

At least one processor 120 may be implemented as a single core processor including one core, and/or may be implemented as at least one multi-core processor including multi-cores (e.g., homogeneous multi-cores and/or heterogeneous multi-cores). In case that the processor 120 is implemented as the multi-core processor, each of the multi-cores included in the multi-core processor may include an internal memory of the processor such as a cache memory or an on-chip memory, and a common cache shared by the multi-cores may be included in the multi-core processor. Alternatively or additionally, each of the multi-cores (and/or some of the multi-cores) included in the multi-core processor may independently read and perform a program instruction for implementing the method according to one or more embodiments of the disclosure. In another example, at least a portion of the multi-cores may be linked to read and/or perform the program instruction for implementing the method according to one or more embodiments of the disclosure.

In a case where the method, according to one or more embodiments of the disclosure, includes a plurality of operations, the plurality of operations may be performed by one core among the multi-cores included in the multi-core processor, and/or may be performed by the multi-cores. For example, in a case that the first operation, the second operation, and the third operation are performed by the method according to one or more embodiments, the first operation, the second operation, and the third operation may be performed by a first core included in the multi-core processor. Alternatively or additionally, the first operation and the second operation may be performed by the first core included in the multi-core processor, and the third operation may be performed by a second core included in the multi-core processor.

As used herein, the processor 120 may refer to a SoC in which at least one processor and other electronic components are integrated, such as, but not limited to, a single core processor, the multi-core processor, or a core included in the single core processor or the multi-core processor. For example, the core may be implemented as the CPU, the GPU, the APU, the MIC, the DSP, the NPU, the hardware accelerator, and/or the machine learning accelerator. However, the disclosure are not limited thereto.

In an embodiment, the at least one processor 120 may transmit, to a communication module 110 (e.g., first communication module 110-1), a first pulse signal for turning on the communication module 110 in a first period in a case where the electronic device 100 is in the standby mode.

As used herein, the standby mode of the electronic device 100 may include the turn-off state of the electronic device 100. Alternatively or additionally, the standby mode of the electronic device 100 may include a mode in which only a portion of the components included in the electronic device 100 are turned on. Consequently, the standby mode of the electronic device 100 may consume less power than a critical power consumed by the electronic device 100 when in an active state.

In an embodiment, the SFP transceiver module, which may be included by the communication module 110, may have higher power consumption level than other implementations of the communication module 110. In such an embodiment, the standby power of the electronic device 100 may be higher than the critical power of the electronic device 100 due to the SFP transceiver module being in the active state even in the standby mode of the electronic device 100.

Therefore, the at least one processor 120, according to one or more embodiments of the disclosure, may transmit, to a first communication module 110-1, the first pulse signal for turning on the first communication module 110-1 from among the plurality of communication modules 110 in the first period, and may not transmit the first pulse signal to the remaining communication modules 110 (e.g., 110-2 to 110-$n$).

According to one or more embodiments, the at least one processor 120 may transmit the first pulse signal to first communication module 110-1, such that the first communication module 110-1 may be turned on in the first period, and the electronic device 100 even in the standby mode may communicate with the display device 200 while the first communication module 110-1 is turned on. Alternatively or additionally, in the standby mode of the electronic device 100, the first communication module 110-1 may be turned on in the first period rather than being always turned on, and consequently, the standby power of the electronic device 100 may be less than the critical power.

Figure 3:
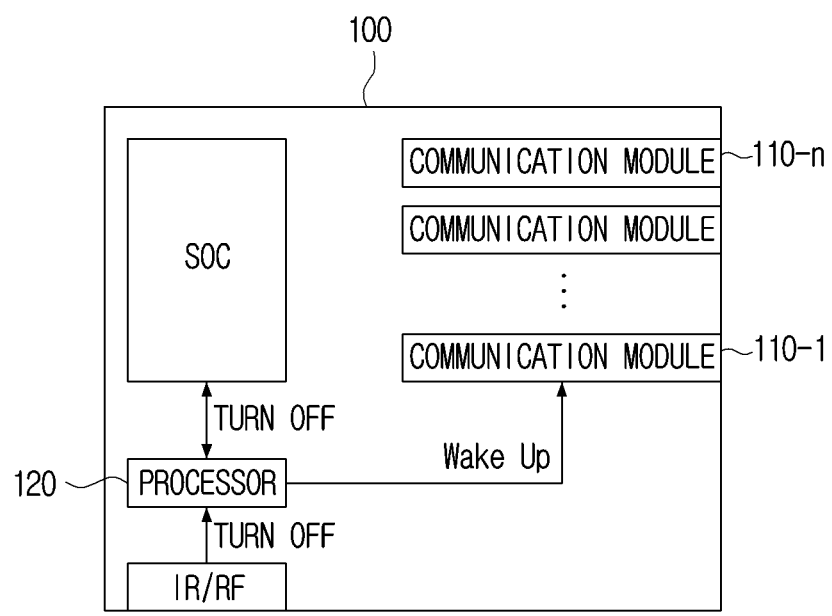
FIG. 3 is a view of the electronic device in a standby mode, according to one or more embodiments of the disclosure.
Figure 3:
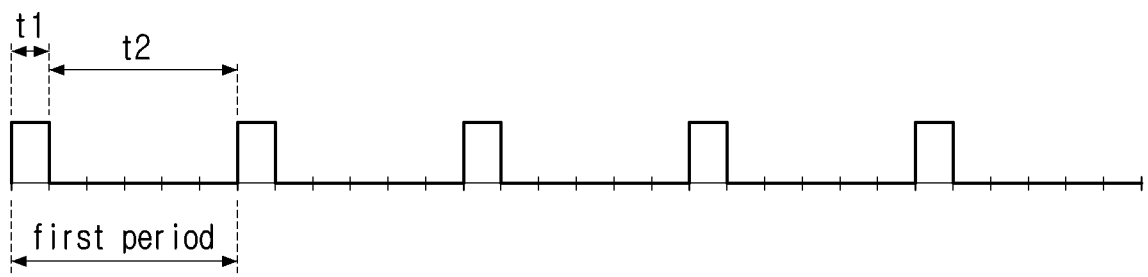

FIG. 3 is a view of the electronic device in the standby mode, according to one or more embodiments of the disclosure.

Referring to FIG. 3, the system-on chip (SoC) may be in an inactive state in the standby mode of the electronic device 100. In an embodiment, the SoC may be and/or include a main processor, and at least one processor 120 may be and/or include a sub-processor. The SoC may be an example of the main processor, and the main processor may include, but not be limited to, at least one of a CPU, a GPU, a APU, a MIC, a DSP, a NPU, a hardware accelerator, and/or a machine learning accelerator.

As shown in FIG. 3, in the standby mode of the electronic device 100, at least one processor 120 may be in the active state, and the at least one processor 120 may transmit, to the first communication module 110-1, the first pulse signal (e.g., a wake-up signal of a first pulse) for turning on (and/or activating) the first communication module 110-1 in the first period.

The first communication module 110-1 receiving the first pulse signal may be turned on during a first time interval t1 of the first period and/or may be turned off during a second time interval t2 of the first period. For example, the first period may be about 0.6 seconds (sec), the first time interval t1 may be about 0.1 sec, and the second time interval t2 may be about 0.5 secs. That is, the first communication module 110-1 receiving the first pulse signal may be turned on at intervals of about 0.6 sec, in which the first communication module 110-1 is turned on for about 0.1 sec, and then turned off for about 0.5 sec.

According to one or more embodiments of the disclosure, the at least one processor 120 may transmit a first control signal to the display module corresponding to the first communication module 110-1 through the first communication module 110-1 in a case of receiving the first control signal for switching the electronic device 100 from the standby mode to the normal mode. For example, the first control signal for switching the electronic device 100 from the standby mode to the normal mode may include a turn-on signal output by a remote controller.

For example, at least one of an infrared (IR) module and a radio frequency (RF) module, that may be included in the communication interface 110, may be in the active state in the standby mode of the electronic device 100. In the standby mode, the at least one processor 120 may acquire the first control signal for switching the electronic device 100 from the standby mode to the normal mode in a case of receiving the turn-on signal output by the remote controller through at least one of IR communication and RF communication.

In a case of acquiring the first control signal, the at least one processor 120 may transmit the first control signal to the display module while the first communication module 110-1 is turned on (e.g., during the first time interval t1 of the first period). The operation of the display module receiving the first control signal transmitted by the first communication module 110-1 is described with reference to FIG. 4.

Figure 4:
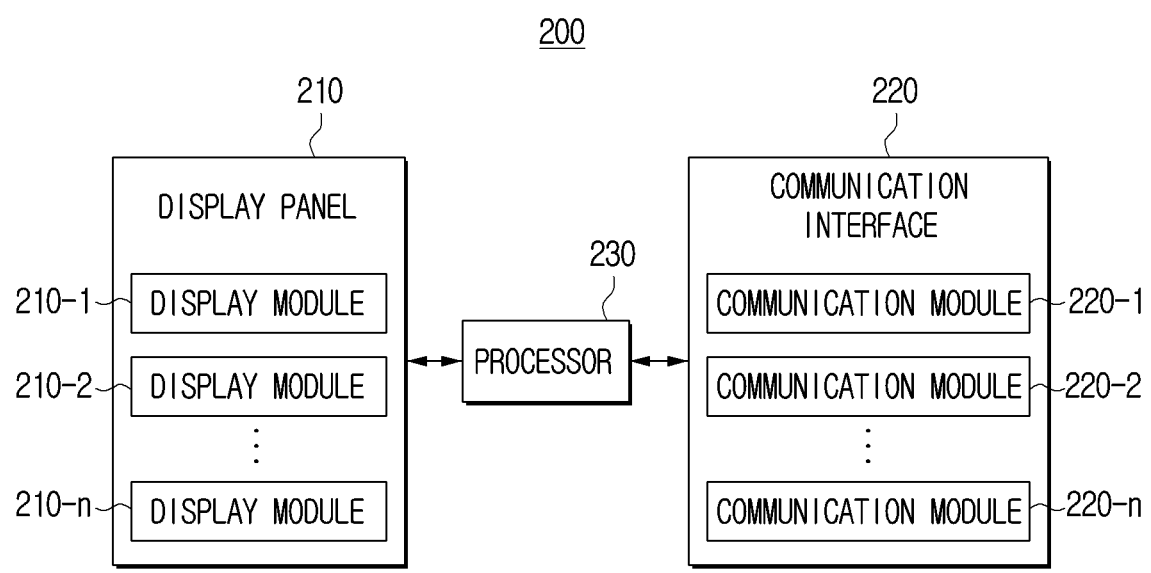
FIG. 4 is a block diagram of a configuration of a display device, according to one or more embodiments of the disclosure.

FIG. 4 is a block diagram of a configuration of the display device, according to one or more embodiments of the disclosure.

Referring to FIG. 4, the display device 200 may include a display panel 210, a communication interface 220, and at least one processor 230.

The display panel 210, according to one or more embodiments, may include a plurality of display modules (e.g., 210-1 to 210-$n$, hereinafter "210" generally). For example, the display device 200 may be and/or include a modular display device, and the plurality of display modules 210 may be combined with each other to implement the display panel 210.

Each of the plurality of display modules 210 may be implemented as any of various types of displays such as, but not limited to, an LCD, an OLED display, an LCoS display, a DLP display, a QD display panel, a QLED display, a micro light-emitting diode (μLED) display, and a mini LED display.

The communication interface 220, according to one or more embodiments, may communicate with an external device (e.g., the electronic device 100), an external server (e.g., a web server, a streaming server) and the like by using a communication method such as an AP-based wireless communication (e.g., a wireless LAN, such as, but not limited to, IEEE 802.11x, Wi-Fi), a Bluetooth™ communication, a Zigbee communication, a wired and/or wireless LAN, a WAN, Ethernet, FireWire, a HDMI, a USB, an MHL, an AES/EBU communication, an optical communication, a coaxial communication, and the like.

In an embodiment, the communication interface 220, according to one or more embodiments of the disclosure, may include a plurality of communication modules (e.g., 220-1 to 220-*n*, hereinafter "220" generally).

Each of the plurality of communication modules 220 may be implemented as an electronic module which may receive the data from the external device (e.g., electronic device 100) through the optical fiber cable. For example, the electronic module may be and/or include an SFP transceiver module.

Hereinafter, for convenience of explanation, the plurality of communication modules 110 included in the electronic device 100 may be collectively referred to as the plurality of first communication modules 110, and the plurality of communication modules 220 included in the display device 200 may be collectively referred to as the plurality of second communication modules 220.

According to one or more embodiments of the disclosure, the plurality of display modules 210 and the plurality of second communication modules 220 may respectively correspond to each other.

For example, a first display module 210-1 of the plurality of display modules 210 may correspond to a second communication module 220-1 of the plurality of second communication modules 220.

Alternatively or additionally, the plurality of first communication modules 110 included in the electronic device 100 and the plurality of second communication modules 220 included in the display device 200 may correspond to each other.

For example, the second communication module 220-1 may transmit the data to a corresponding first display module 210-1 in case that any second communication module 220-1 receives the data (e.g., control signal or content) from any corresponding first communication module 110-1 among the plurality of first communication modules 110 included in the electronic device 100.

At least one processor 230, according to one or more embodiments of the disclosure, may control overall operations of the electronic device 200.

According to one or more embodiments of the disclosure, the processor 230 may be implemented as a DSP processing a digital signal, a microprocessor, and/or a TCON. However, the processor 230 is not limited thereto, and may include, but not be limited to, at least one of a CPU, an MCU, an MPU, a controller, an AP, a CP, an ARM processor, an AI processor, and/or may be defined by this term. Alternatively or additionally, the processor 230 may be implemented in a SoC or an LSI in which the processing algorithm may be embedded, and/or may be implemented in the form of an FPGA. The processor 230 may perform various functions by executing the computer executable instructions stored in the memory (not shown).

The at least one processor 230 may be and/or include at least one of a CPU, a GPU, an APU, a MIC, a DSP, a NPU, a hardware accelerator, and a machine learning accelerator.

The at least one processor 230 may control one of other components of the electronic device or any combination thereof, and/or may perform the operations related to the communication and/or the data processing. The at least one processor 230 may execute at least one program or instruction stored in the memory. For example, the at least one processor 230 may perform the method, according to one or more embodiments of the disclosure, by executing at least one instruction stored in the memory.

In a case where the method, according to one or more embodiments of the disclosure, includes a plurality of operations, the plurality of operations may be performed by one processor 230 and/or a plurality of processors 230. For example, a first operation, a second operation, and a third operation may be performed by the method according to the other embodiment. In this case, the first operation, the second operation, and the third operation may all be performed by the first processor. Alternatively or additionally, the first operation and the second operation may be performed by a first processor (e.g., the general-purpose processor) and the third operation may be performed by a second processor (e.g., the artificial intelligence-only processor).

The at least one processor 230 may be implemented as a single core processor including one core, and/or may be implemented as at least one multi-core processor including multi-cores (e.g., homogeneous multi-cores and/or heterogeneous multi-cores). In a case where the at least one processor 230 is implemented as a multi-core processor, each of the multi-cores included in the multi-core processor may include the internal memory of the processor such as, but not limited to, a cache memory and an on-chip memory, and the common cache shared by the multi-cores may be included in the multi-core processor. Alternatively or additionally, each of the multi-cores (and/or some of the multi-cores) included in the multi-core processor may independently read and/or perform the program instruction for implementing the method according to one or more embodiments of the disclosure, and/or at least a portion of the multi-cores may be linked to read and/or perform the program instruction for implementing the method according to one or more embodiments of the disclosure.

In a case where the method, according to one or more embodiments of the disclosure, includes a plurality of operations, the plurality of operations may be performed by one of the multi-cores included in the multi-core processor and/or may be performed by the multi-cores. For example, in a case where the first operation, the second operation, and the third operation are performed by the method according to the one or more embodiments, the first operation, second operation, and third operation may be performed by the first core included in the multi-core processor. Alternatively or additionally, the first operation and the second operation may be performed by the first core included in the multi-core processor, and the third operation may be performed by the second core included in the multi-core processor.

In some embodiments of the disclosure, the processor 230 may refer to an SoC in which at least one processor and other electronic components are integrated, such as, but not limited to, the single core processor, the multi-core processor, and the core included in the single core processor or the multi-core processor. That is, the core may be implemented as the CPU, the GPU, the APU, the MIC, the DSP, the NPU, the hardware accelerator, and/or the machine learning accelerator. However, the disclosure are not limited thereto.

For example, in a case where the display device 200 is in the standby mode, the at least one processor 230 may transmit, to a second communication module 220-1 of the plurality of second communication modules 220, a second pulse signal for turning on the second communication module 220-1 in a second period.

As used herein, the standby mode of the display device 200 may include the turn-off state of the display device 200. Alternatively or additionally, standby mode of the display device 200 may include a mode in which only some a portion of the components included in the display device 200 are turned on. Consequently, the standby mode of the display device 200 may consume less power than a critical power consumed by the display device 200 when in the active state.

In an embodiment, the SFP transceiver module, which may be included by at least one of the first communication module 110 and the second communication module 220, may have a higher power consumption level than other implementations of the communication modules (e.g., 110 and 220). In such an embodiment, the standby power of the display device 200 may be higher than the critical power of the display device 200 due to the SFP transceiver module being in the active state even in the standby mode of the display device 200.

Therefore, the at least one processor 230, according to one or more embodiments of the disclosure, may transmit, to a second communication module 220, the second pulse signal for turning on the second communication module 220 in the second period. Alternatively or additionally, the at least one processor 230 may not transmit the second pulse signal to the remaining communication modules 220 (e.g., 220-2 to 220-n).

According to one or more embodiments, the at least one processor 230 may transmit the second pulse signal to the second communication module 220, such that the second communication module 220 may be turned on in the second period, and the display device 200, even in the standby mode, may communicate with the electronic device 100 while the second communication module 220 is turned on. Alternatively or additionally, in the standby mode of the display device 200, the second communication module 220 may be turned on in the second cycle rather than being always turned on, and consequently, the standby power of the display device 200 may be less than the critical power.

Figure 5:
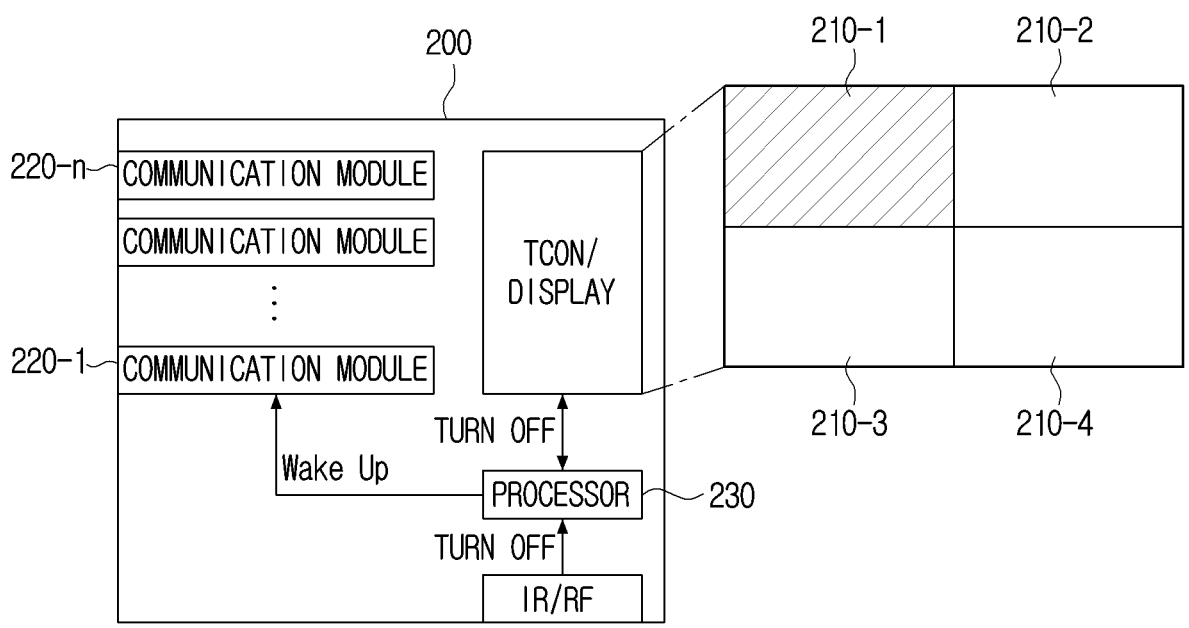
FIG. 5 is a view of the display device in a standby mode, according to one or more embodiments of the disclosure.
Figure 5:
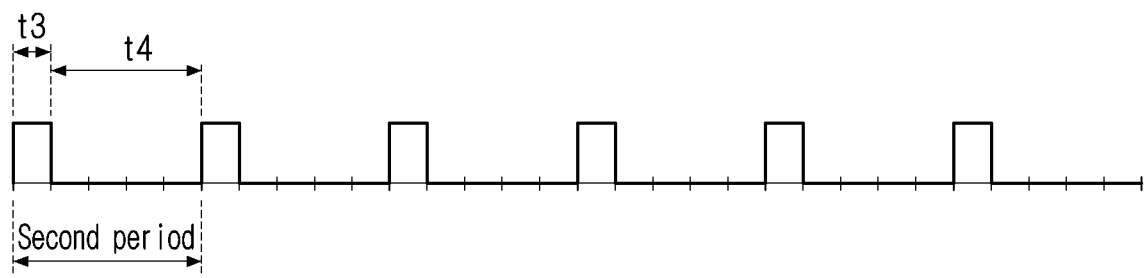

FIG. 5 is a view of the display device in the standby mode according to one or more embodiments of the disclosure.

Referring to FIG. 5, the timing controller (TCON) and the display panel 210 may be in the inactive state in the standby mode of the display device 200.

As shown in FIG. 5, in the standby mode of the display device 200, the at least one processor 230 may be in the active state, and the at least one processor 230 may transmit, to a second communication module 220, the second pulse signal (e.g., a wake-up signal of a second pulse) for turning on (or activating) the second communication module 220 in the second period.

The second communication module 220 receiving the second pulse signal may be turned on during a third time interval t3 of the second period and/or may be turned off during a fourth time interval t4 of the second period. For example, the second period may be about 0.5 sec, the third time interval t3 may be about 0.1 sec, and the fourth time interval t4 may be about 0.4 sec. That is, the second communication module 220 receiving the second pulse signal may be turned on at intervals of about 0.5 sec, in which the second communication module 220 is turned on for about 0.1 sec, and then turned off for about 0.4 sec.

According to one or more embodiments of the disclosure, the at least one processor 230 may transmit a first response signal corresponding to reception of the first control signal to a first communication module 110 through the second communication module 220 in a case of receiving the first control signal from the first communication module 110 corresponding to the second communication module 220 while the second communication module 220-1 is turned on (e.g., during the third time interval t3 of the second period) in the standby mode of the display device 200.

In an embodiment, the at least one processor 230 may switch the display device 200 from the standby mode to the normal mode based on the first control signal.

Alternatively or additionally, the at least one processor 120 included in the electronic device 100 may switch the electronic device 100 from the standby mode to the normal mode in a case of receiving the first response signal from the second communication module 220 through the first communication module 110.

Figure 6:
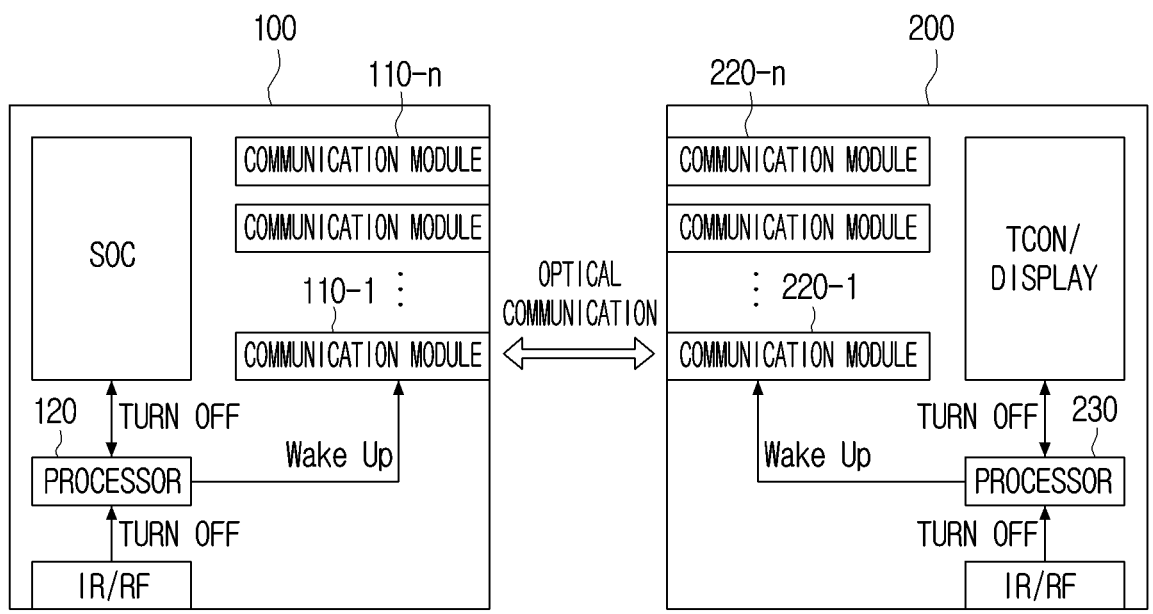
FIG. 6 is a view of communication between the electronic device and the display device, according to one or more embodiments of the disclosure.
Figure 6:
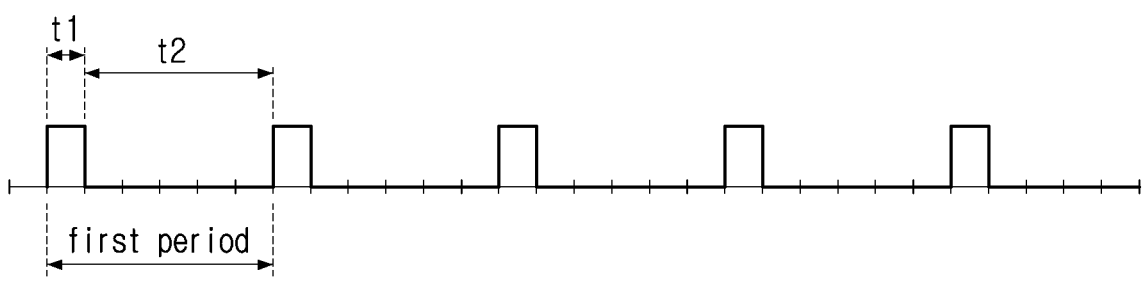
Figure 6:
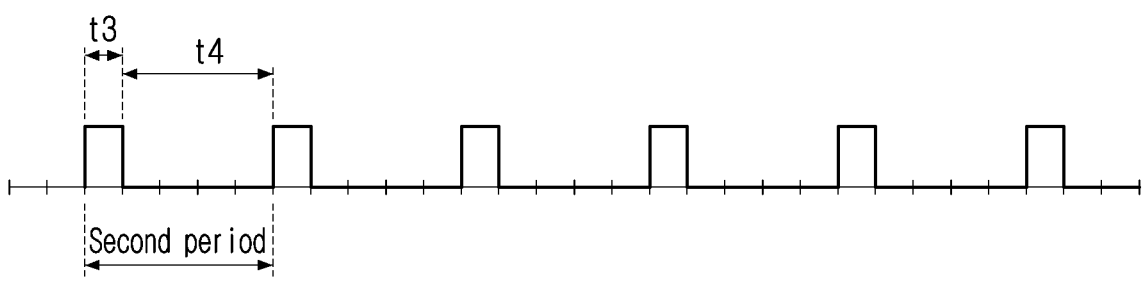

FIG. 6 is a view of the communication between the electronic device and the display device, according to one or more embodiments of the disclosure.

Referring to FIG. 6, each of the electronic device 100 and the display device 200 may be in the standby mode, the at least one processor 120 included in the electronic device 100 may transmit the first pulse signal in the first period to a first communication module 110, and the at least one processor 230 included in the display device 200 may transmit the second pulse signal in the second period to a second communication module 220.

In an embodiment, the first period and the second period may be different from each other. Consequently, a time interval may exist where the first time interval t1 in which the first communication module 110-1 is turned on and the third time interval t3 in which the second communication module 220 is turned on correspond to each other.

For example, in a case where the first period is 0.6 sec and the second period is 0.5 sec, a specific time interval may exist where the first time interval t1 in which the first communication module 110 is turned on within 3 sec, which is the least common multiple of the first period and the second period, and the third time interval t3 in which the second communication module 220 is turned on may overlap each other.

For example, in a case where the first time interval t1 in which the first communication module 110 is turned on and the third time interval t3 in which the second communication module 220 is turned on overlap each other, the first communication module 110 and the second communication module 220 may all be turned on. Thusly, the electronic device 100 and the display device 200 may communicate with each other even though the electronic device 100 and the display device 200 are in the standby mode.

According to one or more embodiments, the first control signal for switching the electronic device 100 from the standby mode to the normal mode may be transmitted from a first communication module 110 to the display device 200 through a second communication module 220 in a case where the first time interval t1 in which the first communication module 110 is turned on corresponds to the third time interval t3 in which the second communication module 220 is turned on.

According to one or more embodiments, in a case of receiving the first control signal, the at least one processor 230 included in the display device 200 may transmit the first response signal corresponding to the reception of the first control signal from the second communication module 220 to the electronic device 100 through the first communication module 110.

In a case of receiving the first response signal, the at least one processor 120 included in the electronic device 100 may switch the electronic device 100 from the standby mode to the normal mode. In a case of receiving the first response signal, the at least one processor 230 included in the display device 200 may switch the display device 200 from the standby mode to the normal mode.

Therefore, in a case in which one of the electronic device 100 and the display device 200 is turned on (e.g., switched from the standby mode to the normal mode), the other devices may also be automatically turned on (e.g., switched from the standby mode to the normal mode). Consequently, the electronic device 100 and the display device 200 may all be switched from the standby mode to the normal mode.

Figure 7:
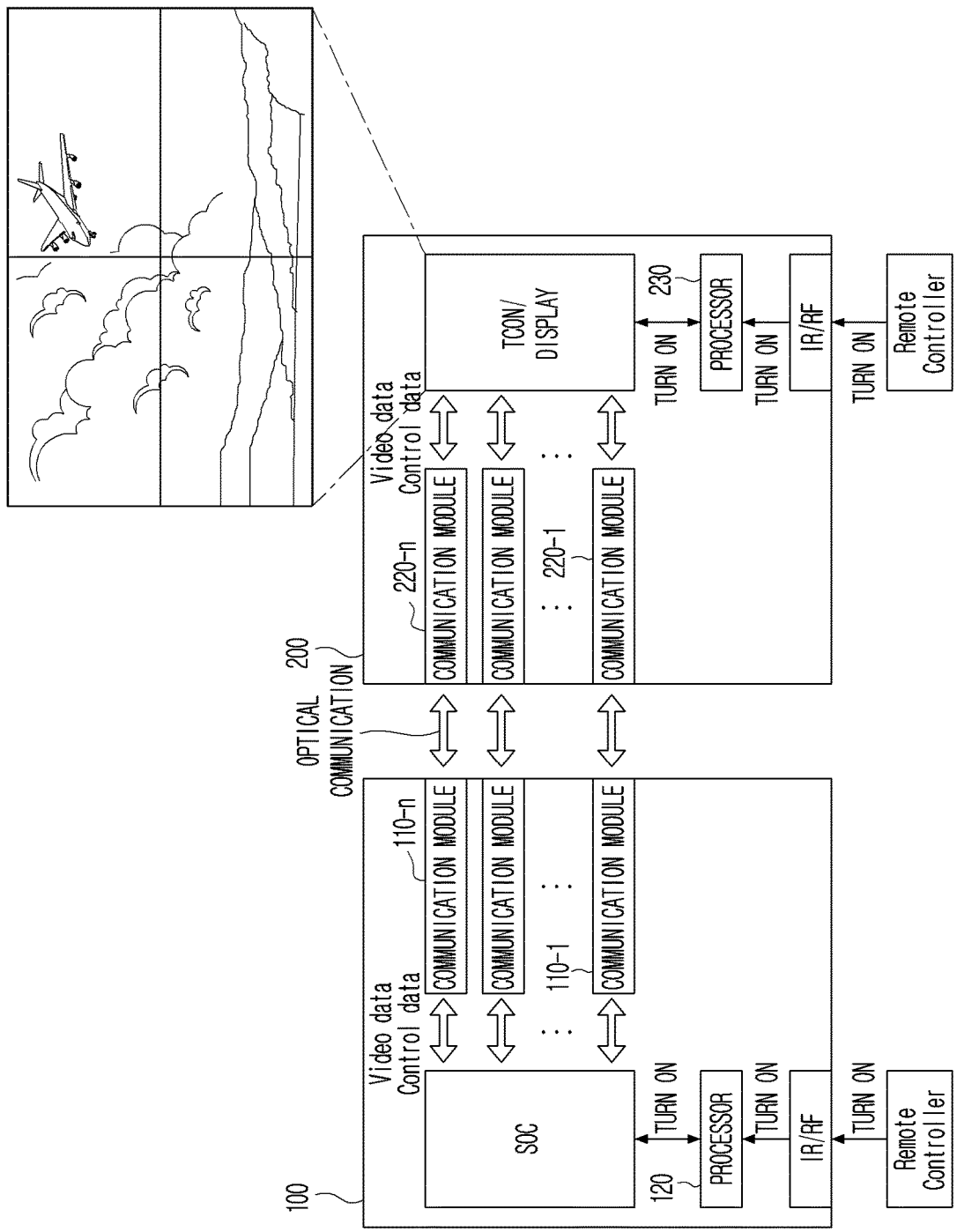
FIG. 7 is a view of the electronic device in a normal mode and the display device in a normal mode, according to one or more embodiments of the disclosure.

FIG. 7 is a view of the electronic device in the normal mode and the display device in the normal mode, according to one or more embodiments of the disclosure.

According to one or more embodiments, at least one processor 120 may transmit content to the plurality of display modules 210 through the plurality of first communication modules 110 in a case in which the electronic device 100 is switched to the normal mode.

As used herein, the normal mode may include a mode in which the plurality of elements included in each of the electronic device 100 and the display device 200 are in the active state. For example, each of the plurality of first communication modules 110 included in the electronic device 100 may be turned on in the normal mode of the electronic device 100, and each of the plurality of second communication modules 210 included in the display device 200 may be turned on in the normal mode of the display device 200.

In an embodiment, the display device 200 may display the content received through the display panel 210.

As described above, in various embodiments, the electronic device 100 may receive the first control signal for switching the electronic device 100 from the standby mode to the normal mode from the remote controller. However, the disclosure is not limited in this regard and the display device 200 may receive a second control signal for switching the display device 200 from the standby mode to the normal mode from the remote controller.

For example, in a case of receiving a second control signal for switching the display device 200 from the standby mode to the normal mode, the at least one processor 230 may transmit the second control signal to the first communication module 110 corresponding to the second communication module 220 through the second communication module 220 in the standby mode of the display device 200. In an embodiment, the second control signal may include a turn-on signal output by the remote controller.

For example, at least one of an IR module and an RF module, that may be included in the communication interface 220, may be in the active state in the standby mode of the display device 200. In the standby mode, the at least one processor 230 may acquire the second control signal for switching the display device 200 from the standby mode to the normal mode in a case of receiving the turn-on signal output by the remote controller through at least one of IR communication and RF communication.

In a case of acquiring the second control signal, the at least one processor 230 may transmit the second control signal to the first communication module 110 while the second communication module 220 is turned on (e.g., for the third time interval t3 in the second period).

According to one or more embodiments, the second control signal may be transmitted from the second communication module 220 to the electronic device 200 through the first communication module 110 in a case where the third time interval t3 in which the second communication module 220 is turned on corresponds to the first time interval t1 in which the first communication module 110 is turned on.

In a case of receiving the second control signal, the at least one processor 120 included in the electronic device 100 may transmit a second response signal corresponding to reception of the second control signal from the first communication module 110 to the display device 200 through the second communication module 220.

In a case of receiving the second response signal, the at least one processor 230 included in the display device 200 may switch the display device 200 from the standby mode to the normal mode. In a case of receiving the second response signal, the at least one processor 120 included in the electronic device 100 may switch the electronic device 100 from the standby mode to the normal mode. Thusly, the electronic device 100 and the display device 200 may be switched from the standby mode to the normal mode.

As described above, in various embodiments, the electronic device 100 may receive the first control signal for switching the electronic device 100 from the standby mode to the normal mode and the display device 200 may receive the second control signal for switching the display device 200 from the standby mode to the normal mode. However, the disclosure is not limited in this regard and the electronic device 100 and/or the display device 200 may receive a control signal for switching from the normal mode to the standby more.

For example, the electronic device 100 may transmit the control signal to the display device 200 through the communication interface 110 in a case of receiving the control signal for switching the electronic device 100 to the standby mode from the remote controller when the electronic device 100 is in the normal mode.

In an embodiment, the display device 200 may transmit a response signal indicating reception of the control signal to the electronic device 100 through the communication interface 220, and the display device 200 may switch the display device 200 from the normal mode to the standby mode. Alternatively or additionally, in a case of receiving the response signal, the electronic device 100 may switch the electronic device 100 from the normal mode to the standby mode. Thusly, the electronic device 100 and the display device 200 may be switched from the normal mode to the standby mode.

In an embodiment, the display device 200 may transmit the control signal to the electronic device 100 through the communication interface 220 in a case of receiving the control signal for switching the display device 200 to the standby mode from the remote controller when the display device 200 is in the normal mode.

The electronic device 100 may transmit the response signal indicating reception of the control signal to the display device 200 through the communication interface 110, and the electronic device 100 may switch the electronic device 100 from the normal mode to the standby mode. Alternatively or additionally, in case of receiving the response signal, the display device 200 may switch the display device 200 from the normal mode to the standby mode. Therefore, the electronic device 100 and the display device 200 may be switched from the normal mode to the standby mode.

Various embodiments of the disclosure may be implemented in a display system including the electronic device 100 and the display device 200.

Each of the electronic device 100 and the display device 200, according to one or more embodiments of the disclosure, may include an input/output interface. The input/output interface may be and/or include at least one of a HDMI interface, a MHL interface, a USB interface, a display port (DP) interface, a Thunderbolt interface, a video graphics array (VGA) port, a red-green-blue (RGB) port, a D-sub-miniature (D-SUB) port, and a digital visual interface (DVI).

FIG. 8 is a flowchart of a control method of an electronic device, according to one or more embodiments of the disclosure.

The control method of an electronic device, according to one or more embodiments of the disclosure, may include transmitting a first pulse signal for turning on one communication module in a first period to one communication module among the plurality of communication modules in case that the electronic device is in a standby mode (operation S810).

In operation S820, the control method may include determining whether a first control signal for switching the electronic device 100 to a normal mode has been received. In a case that a first control signal for switching the electronic device to a normal mode has been received (YES in operation S820), the control method may include transmitting the first control signal to a display module corresponding to one communication module through one communication module (operation S830). In a case that the first control signal for switching the electronic device to a normal mode has not been received (NO in operation S820), the control method may end.

In operation S840, the control method may determine whether a first response signal corresponding to reception of the first control signal from the display module has been received. In a case that a first response signal corresponding to reception of the first control signal has been received from the display module (YES in operation S840), the control method may include switching the electronic device to the normal mode (operation S850). In a case that the first response signal corresponding to reception of the first control signal been received from the display module has not been received (NO in operation S840), the control method may end.

One communication module, according to one or more embodiments, may be turned on during a first time interval and turned off during a second time interval, in the first period, based on a first pulse signal, and the operation S830 of transmitting of the first control signal to the display module may include transmitting the first control signal to the display module while the communication module is turned on.

The first control signal, according to one or more embodiments, may be transmitted to the display module in a case where the first time interval in which the communication module is turned on corresponds to a third time interval in which a communication module included in the display module is turned on, and the communication module included in the display module may be turned on during the third time interval and turned off during a fourth time interval, in a second period, based on a second pulse signal.

The control method, according to one or more embodiments, may further include providing content to the display module corresponding to each of the plurality of communication modules in a case that the electronic device is switched to the normal mode.

The control method, according to one or more embodiments, may further include controlling one communication module to transmit a second response signal corresponding to reception of a second control signal in a case where the second control signal is received from the display module while one of the communication modules is turned on, and switching the electronic device from the standby mode to the normal mode.

The communication module included in the display module, according to one or more embodiments, may be turned on during the third time interval and turned off during the fourth time interval, in the second period, based on the second pulse signal. Alternatively or additionally, the controlling of the one communication module may include receiving the second control signal in a case where the first time interval in which one communication module is turned on corresponds to the third time interval in which the communication module included in the display module is turned on.

According to one or more embodiments, the first control signal may be a control signal received by the electronic device from a remote controller, and the second control signal may be a control signal received by the display device from the remote controller.

Each of the plurality of communication modules, according to one or more embodiments, may be and/or may include a SFP module connected to the communication module included in the corresponding display module by an optical cable.

According to one or more embodiments, the display device may be in the standby mode in a case where the electronic device is in the standby mode, and/or the display device may be in the normal mode in a case where the electronic device is in the normal mode.

The various embodiments of the disclosure may be applied to various types of electronic devices, as well as, the electronic device and the display device.

The various embodiments described above may be implemented in a computer or a computer-readable recording medium using software, hardware, or a combination of software and hardware. In some cases, the embodiments described in the disclosure may be implemented by a processor itself. According to a software implementation, the embodiments such as the procedures and functions described in the disclosure may be implemented by separate software modules. Each of the software modules may perform one or more functions and operations described in the disclosure.

In an embodiment, computer instructions for performing processing operations of the electronic device, according to the various embodiments of the disclosure, may be stored in a non-transitory computer-readable medium. The computer instructions stored in the non-transitory computer-readable medium may allow a specific device to perform the processing operations of the electronic device according to the various embodiments described above based on the computer instructions executed by a processor of the specific device.

The non-transitory computer-readable medium may not refer to a medium that stores data therein for a short time, such as a register, a cache, or a memory, and may indicate a medium that semi-permanently stores data therein and that may be readable by the machine. A specific example of the non-transitory computer-readable medium may include, but not be limited to, a compact disk (CD), a DVD, a hard disk, a Blu-ray disk, a USB drive, a memory card, a read-only memory (ROM), and the like.

Although the embodiments of the disclosure have been shown and described hereinabove, the disclosure is not limited to the above-mentioned specific embodiments, and may be variously modified by those skilled in the art to which the disclosure pertains without departing from the scope and spirit of the disclosure as disclosed in the accompanying claims. These modifications should also be understood to fall within the scope and spirit of the disclosure.

What is claimed is:

1. An electronic device comprising:
a communication interface comprising a plurality of communication modules configured to communicate with a plurality of display modules of a display device, each communication module of the plurality of communication modules corresponding to a respective display module of the plurality of display modules; and
at least one processor communicatively coupled to the communication interface and configured to:
transmit, to a first communication module of the plurality of communication modules, a first pulse signal configured to turn on the first communication module in a first time period, based on a standby mode of the electronic device,
based on a first remote control signal for switching the electronic device from the standby mode to a normal mode being received, transmit, via the first communication module to a first display module of the plurality of display modules corresponding to the first communication module, a first control signal, and
based on a first response signal indicating reception of the first control signal by the first display module being received from the first display module, switch the electronic device from the standby mode to the normal mode.

2. The electronic device of claim 1, wherein the at least one processor is further configured to:
turn on the first communication module during a first time interval of the first time period and turn off the first communication module during a second time interval of the first time period, based on the first pulse signal, and
transmit, to the first display module, the first control signal while the first communication module is turned on.

3. The electronic device of claim 2, wherein the at least one processor is further configured to:
transmit, to the first display module, the first control signal based on the first time interval corresponding to a third time interval of a second time period during which a second communication module of the display device corresponding to the first display module is turned on, and
wherein the second communication module has been turned on during the third time interval and has been turned off during a fourth time interval of the second time period, based on a second pulse signal.

4. The electronic device of claim 1, wherein the at least one processor is further configured to:
control the communication interface to provide content to the plurality of display modules corresponding to the plurality of communication modules, based on the electronic device having switched to the normal mode.

5. The electronic device of claim 1, wherein the at least one processor is further configured to:
control the first communication module to transmit, to the first display module, a second response signal indicating reception of a second control signal from the first display module, while the first communication module is turned on, and
switch the electronic device from the standby mode to the normal mode based on receiving, from the first display module, the second control signal.

6. The electronic device of claim 5, wherein the at least one processor is further configured to:
receive, via the first communication module, the second control signal based on a first time interval of the first time period during which the first communication module is turned on corresponding to a third time interval of a second time period during which a second communication module of the first display module is turned on, and
wherein the second communication module has been turned on during the third time interval and turned off during a fourth time interval of the second time period, based on a second pulse signal.

7. The electronic device of claim 5, wherein the first remote control signal is received by the electronic device from a remote controller, and
wherein the second control signal is received by the electronic device based on the display device receiving a second remote control signal from the remote controller.

8. The electronic device of claim 1, wherein each communication module of the plurality of communication modules comprises a small form-factor pluggable (SFP) module connected by an optical cable to a corresponding communication module of the corresponding display module of the plurality of display modules.

9. The electronic device of claim 1, wherein the at least one processor is further configured to:
switch the electronic device to the standby mode and cause the display device to switch to the standby mode based on the electronic device having switched to the standby mode; and
switch the electronic device to the normal mode and cause the display device to switch to the normal mode based on the electronic device having switched to the normal mode.

10. A control method of an electronic device which includes a plurality of communication modules corresponding to a plurality of display modules of a display device, the control method comprising:
based on the electronic device being in a standby mode, transmitting, to a first communication module of the plurality of communication modules, a first pulse signal configured to turn on the first communication module in a first time period;
based on a first remote control signal for switching the electronic device from the standby mode to a normal mode being received, transmitting, via the first communication module to a first display module of the plurality of display modules of the display device, a first control signal; and
based on a first response signal indicating reception of the first control signal being received from the first display module, switching the electronic device to the normal mode.

11. The control method of claim 10, further comprising:
turning on the first communication module during a first time interval of the first time period and turning off the first communication module during a second time interval of the first time period, based on the first pulse signal,
wherein the transmitting of the first control signal comprises transmitting, via the first communication module to the first display module, the first control signal while the first communication module is turned on.

12. The control method of claim 11, wherein the transmitting of the first control signal comprises:
transmitting, via the first communication module to the first display module, the first control signal based on the first time interval corresponding to a third time interval of a second time period during which a second communication module of the display device corresponding to the first display module is turned on, and
wherein the second communication module has been turned on during the third time interval and has been turned off during a fourth time interval of the second time period, based on a second pulse signal.

13. The control method of claim 10, further comprising:
providing content to the plurality of display modules corresponding to the plurality of communication modules, based on the electronic device having switched to the normal mode.

14. The control method of claim 10, further comprising:
controlling the first communication module to transmit, to the first display module, a second response signal indicating reception of a second control signal from the first display module while the first communication module is turned on; and
switching the electronic device from the standby mode to the normal mode, based on receiving, from the first display module, the second control signal.

15. The control method of claim 14, further comprising:
receiving, via the first communication module, the second control signal based on a first time interval of the first time period during which the first communication module is turned on corresponding to a third time interval of a second time period during which a second communication module of the first display module is turned on,
wherein the second communication module has been turned on during the third time interval and turned off during a fourth time interval of the second time period, based on a second pulse signal.

16. The control method of claim 14, wherein the first remote control signal is received by the electronic device from a remote controller, and
the second control signal is received by the electronic device based on the display device receiving a second remote control signal from the remote controller.

17. The control method of claim 11, further comprising:
switching the electronic device to the standby mode and causing the display device to switch to the standby mode, based on the electronic device having switched to the standby mode; and
switching the electronic device to the normal mode and causing the display device to switch to the normal mode, based on the electronic device having switched to the normal mode.

18. A display system comprising:
an electronic device comprising:
a first communication interface comprising a plurality of first communication modules; and
at least one first processor configured to transmit, to a first communication module of the plurality of first communication modules, a first pulse signal configured to turn on the first communication module in a first period, when the electronic device is in a standby mode; and
a display device comprising:
a plurality of display modules, each of the plurality of display modules comprising a second communication interface;
a plurality of second communication modules corresponding to the plurality of first communication modules; and
at least one second processor configured to transmit, to a second communication module of the plurality of second communication modules, a second pulse signal configured to turn on the first communication module in a second period, when the display device is in the standby mode.

19. The display system of claim 18, wherein the at least one second processor is further configured to transmit, to the electronic device, a second control signal configured to turn on the electronic device, and
the at least one first processor is further configured to:
control the first communication module to transmit, to a first display module of the plurality of display modules, a second response signal indicating reception of the second control signal from the first display module, when the first communication module is turned on, and
switch the electronic device from the standby mode to a normal mode based on receiving, from the first display module, the second control signal.

20. The display system of claim 18, wherein the at least one first processor is further configured to:
switch the electronic device to the standby mode and cause the display device to switch to the standby mode based on the electronic device having switched to the standby mode; and
switch the electronic device to a normal mode and cause the display device to switch to the normal mode based on the electronic device having switched to the normal mode, and
the at least one second processor is further configured to execute the instructions to:
switch the display device to the standby mode and cause the electronic device to switch to the standby mode based on the display device having switched to the standby mode; and
switch the display device to the normal mode and cause the electronic device to switch to the normal mode based on the display device having switched to the normal mode.

* * * * *